United States Patent [19]

Bertolasi

[11] 4,042,059
[45] Aug. 16, 1977

[54] ANTI-SPIN CONTROL SYSTEM

[75] Inventor: Robert B. Bertolasi, Rockford, Ill.

[73] Assignee: Kelsey-Hayes Company, Romulus, Mich.

[21] Appl. No.: 595,566

[22] Filed: July 14, 1975

Related U.S. Application Data

[63] Continuation-in-part of Ser. No. 362,334, May 21, 1973, abandoned.

[51] Int. Cl.² ........................... B60T 8/18; B60T 8/24
[52] U.S. Cl. .............................. 180/103 R; 180/82 R; 180/79.1; 303/100
[58] Field of Search ............ 180/82 R, 103 R, 105 R, 180/105 E, 44 R, 76; 303/100, 99, 95, 96, 97, 98, 99

[56] References Cited

U.S. PATENT DOCUMENTS

| | | | |
|---|---|---|---|
| 2,771,146 | 11/1956 | Faso | 180/76 |
| 2,957,535 | 10/1960 | Helgeson | 180/79.2 R |
| 3,288,232 | 11/1966 | Shepherd | 303/21 EB |
| 3,300,002 | 1/1967 | Roper | 180/44 R |
| 3,667,813 | 6/1972 | Burckhardt | 303/21 EB |
| 3,706,352 | 12/1972 | Ferguson | 180/103 B |
| 3,719,246 | 3/1973 | Bott | 180/103 R |
| 3,756,335 | 9/1973 | Eisele | 180/6.5 X |
| 3,779,331 | 12/1973 | Burckhardt | 180/82 R |

Primary Examiner—John P. Silverstrim
Attorney, Agent, or Firm—Harness, Dickey & Pierce

[57] ABSTRACT

An anti-spin control system for wheeled vehicles having an improved steering angle compensating unit which is preferably in the form of a potentiometer having a resistive element with opposite end terminals connected to a reference potential and an intermediate terminal which is connected to receive the wheel speed signal from its respective wheel speed sensor and which is asymetrically disposed with respect to the end terminals. The potentiometer additionally has a wiping arm which is associated with a vehicle steering member so as to be movable therewith across the resistive element so as to provide a potential at the wiper arm which is determined in accordance with the position of the vehicle steering member and the asymmetrical location of the intermediate terminal. An adjusted wheel speed signal is thus provided at the wiper arm of the potentiometer which initially increases and then decreases in accordance with the position of the steering element for turns in one direction. In this manner, the speed signals of the steerable wheels of the vehicle are compensated for changes in turning radius due to changes in steering angle. Alternative embodiments which utilize the steering angle compensation unit to adjust other signals in the circuit to accomplish the same result are also disclosed.

28 Claims, 11 Drawing Figures

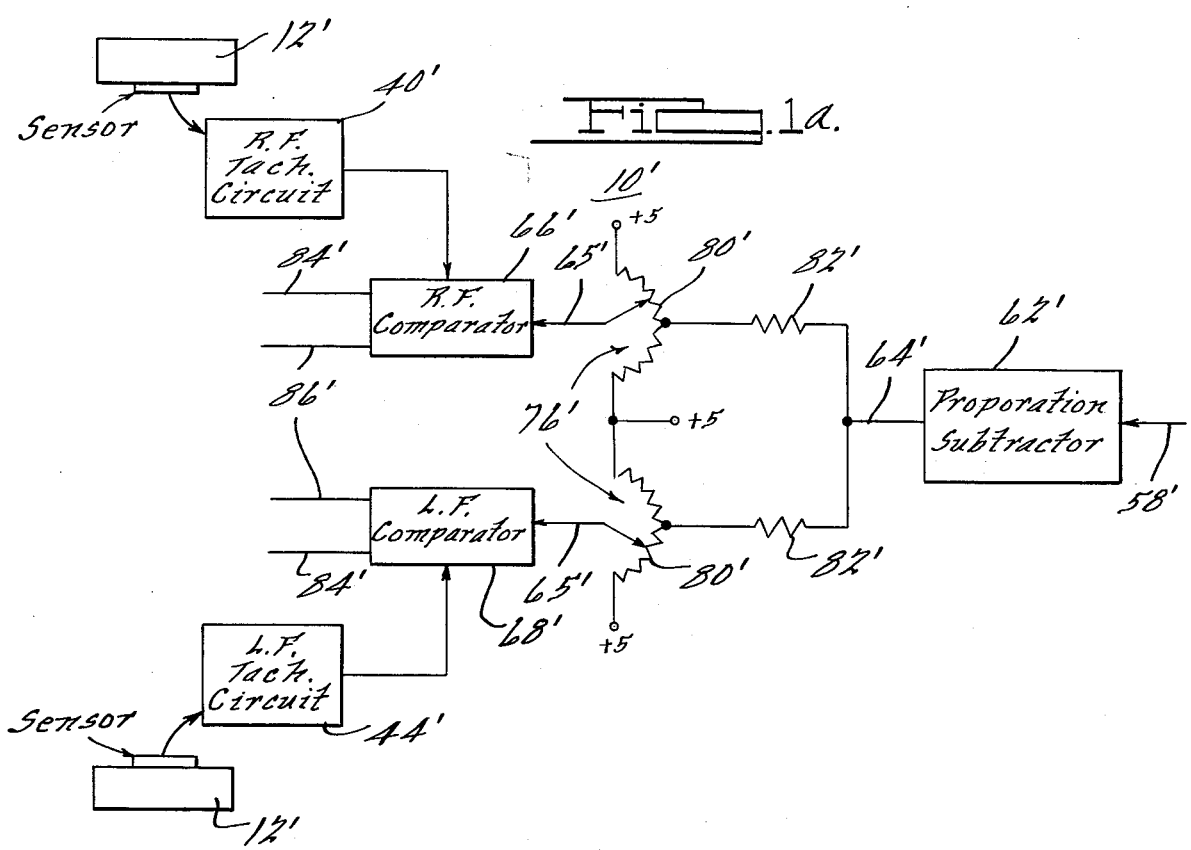
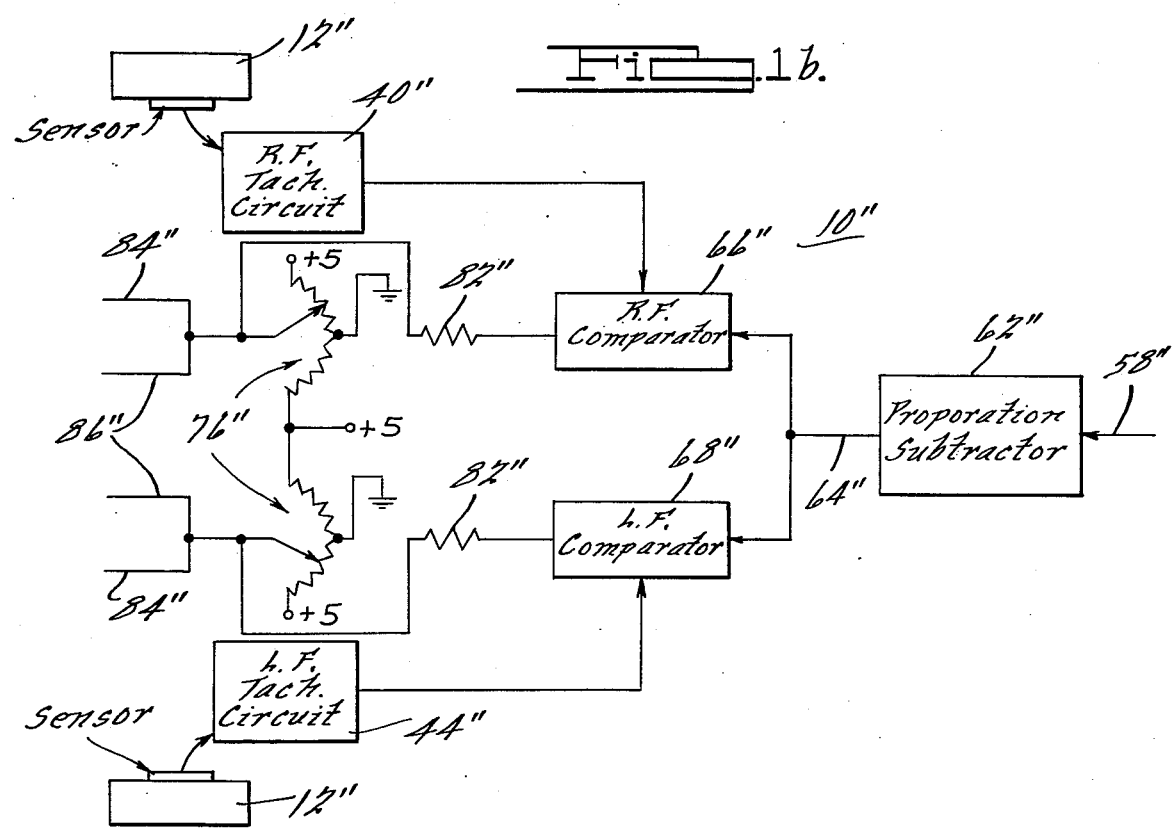

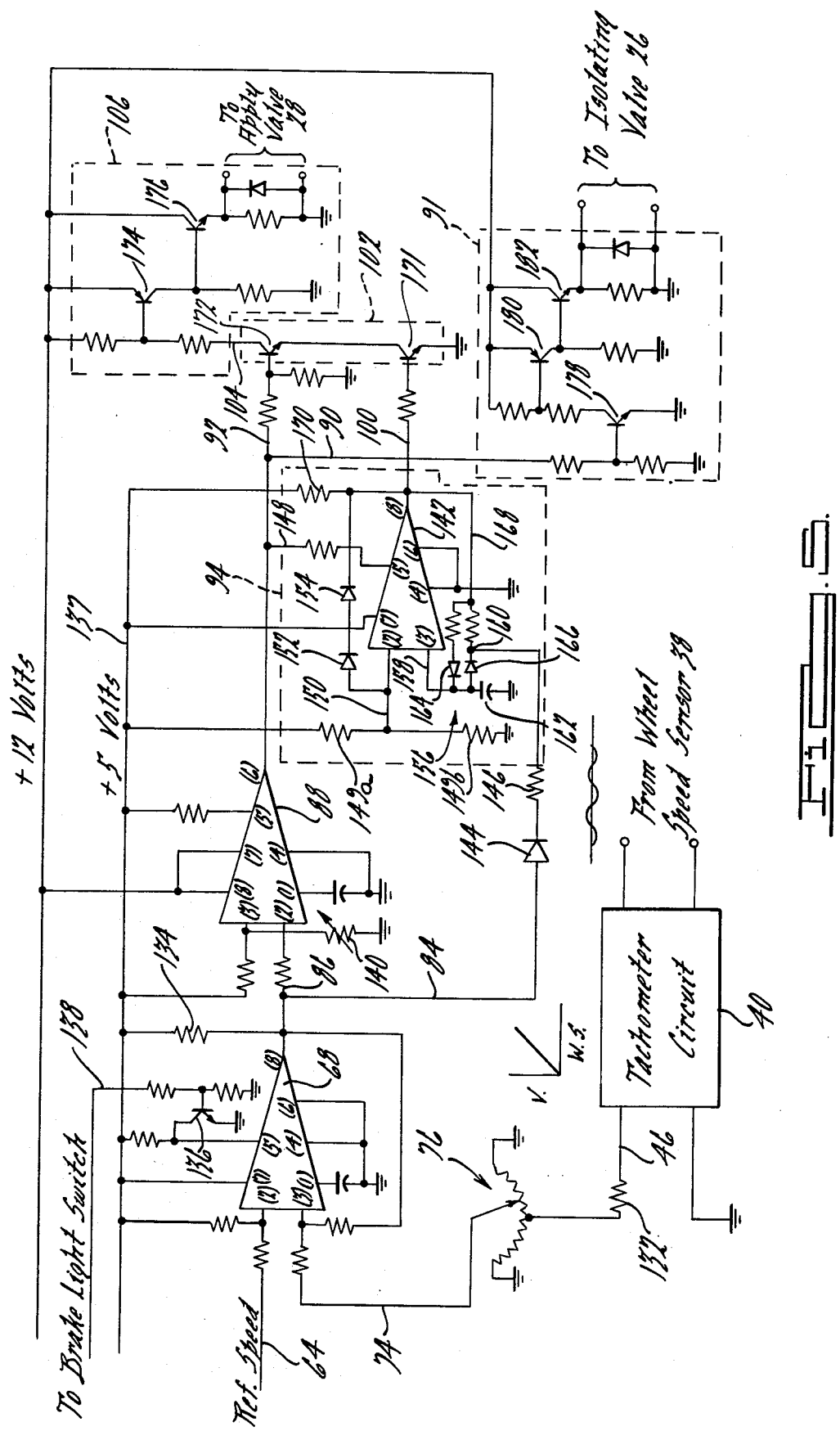

ANTI-SPIN CONTROL SYSTEM

BACKGROUND AND SUMMARY OF THE INVENTION

This application is a continuation in-part of application for United States Letters Pat. Ser. No. 362,334, Filed May 21, 1973, and entitled "Anti-Spin Control System" (now abandoned).

The present invention relates to anti-spin control systems for vehicles generally. While the preferred embodiment has particularly advantageous application to construction vehicles and the like which use very large tires and which are intended to operate on unimproved surfaces, it should be understood that the principles of this invention are also applicable to a wide range of vehicles including, but not limited to, utility trucks, law enforcement vehicles, off-road recreation vehicles, etc.

Large off-road construction vehicles commonly use tires which may be more than 10 feet in diameter and which cost more than one thousand dollars. These very large tires have been found to be especially susceptible to damage from wheel spin occasioned by excessive application of power to the wheel. In this regard, it will be appreciated that the roadway or surfaces on which these construction vehicles are used often offer marginal traction. Moreover, the available traction can vary between distant extremes since these vehicles operate on a wide variety of surfaces. Consequently, it is difficult for even a highly skilled vehicle operator to avoid wheel spin at all times.

When one of these very large tires is damaged by wheel spin, the economic consequences are significant not only in terms of the replacement or repair costs of the tire, but also in terms of the down-time of the vehicle. Accordingly, it is desirable to provide an effective anti-spin system for such vehicles which will minimize the likelihood of damage to the vehicles due to wheel spin. Since the large wheels of these vehicles can tolerate only very low levels of spin without endangering the tires, the prior art has found it necessary to incorporate steering angle compensation in these anti-spin control systems to account for changes in the relative rotational speeds of the wheels of the vehicle due to changes in steering angle.

The present system provides an improved steering angle compensating unit for an anti-spin control system, and additionally provides an improved logic for an anti-spin control system. The improved steering angle compensating unit of this invention modifies the response of the system to wheel speed signals of the steerable wheels such that the response of the system to the wheel speed of the inside wheel initially increases as the radius of the turn decreases and thereafter decreases as the radius of the turn additionally decreases so as to accommodate an initial decrease in the inside wheel speed while the inside wheel turning radius is less than the average vehicle turning radius and a subsequent increase in the inside wheel speed while the inside wheel turning radius is greater than the average vehicle turning radius. The outside steerable wheel has a turning radius which is at all times outside of the actual vehicle turning radius so that the above "over center" response of the inside front wheel is not provided for the outside steerable wheel. However, the turning radius of the outside steerable wheel increases relative to the average vehicle turning radius as the steering angle is increased so that the sensitivity of the anti-spin control system to the outside steerable wheel speed is decreased as the steering angle is increased.

The steering angle compensating unit of the present invention preferably includes a potentiometer which has a resistive element with opposite terminals connected to a reference potential such as ground potential and an intermediate terminal which receives the wheel speed signal and which is asymetrically connected relative to the end terminals to provide an "over center" effect as described above. The extent to which the intermediate terminal is asymetrically located depends upon the degree that the turning radius of the inside steerable wheel varies relative to the average turning radius of the vehicle as the steering angle is increased. The potentiometer has a wiper arm which is electrically engageable with the resistive element and which is connected to a steering member for the vehicle, for example, the pitman arm of the vehicle, for movement along the resistive element in accordance with the movement of the steering member. The wiper arm provides an output signal which represents a wheel speed signal which is compensated for steering angle. Steering angle compensation could also be accomplished using any other potentiometer having a variation in resistive path between the input and the output terminals with wiper movement to provide the desired transfer characteristics as taught herein.

In the preferred form of the anti-spin control system of the present invention a comparator is utilized which is responsive to wheel speed signals having magnitudes in excess of a reference speed signal but which is non-responsive to wheel speed signals having magnitudes less that the reference signal. Additionally, the preferred comparator provides a proportional output for difference in magnitude between the wheel speed signal and the reference signals which are less than a predetermined magnitude representative of a predetermined difference between the wheel speed and the vehicle speed, and provides a maximum output signal for differences in magnitude which are greater than the predetermined magnitude.

Other features and advantages of the anti-spin control circuit of the present invention will be apparent to those skilled in this art in view of the Detailed Description of the Preferred Embodiment hereinafter.

BRIEF DESCRIPTION OF THE DRAWINGS

FIG. 1a is a block diagram of an alternative to the embodiment disclosed in FIG. 1.

FIG. 1b is a block diagram of another alternative to the embodiment shown in FIG. 1;

FIG. 5 is a circuit diagram of an exemplary preferred signal processing circuit for a steerable wheel of the anti-spin control system of FIG. 1;

FIG. 5a is a circuit diagram of the alternative embodiment disclosed in the block diagram of FIG. 1a.

DETAILED DESCRIPTION OF THE PREFERRED EMBODIMENT

Figure 1:
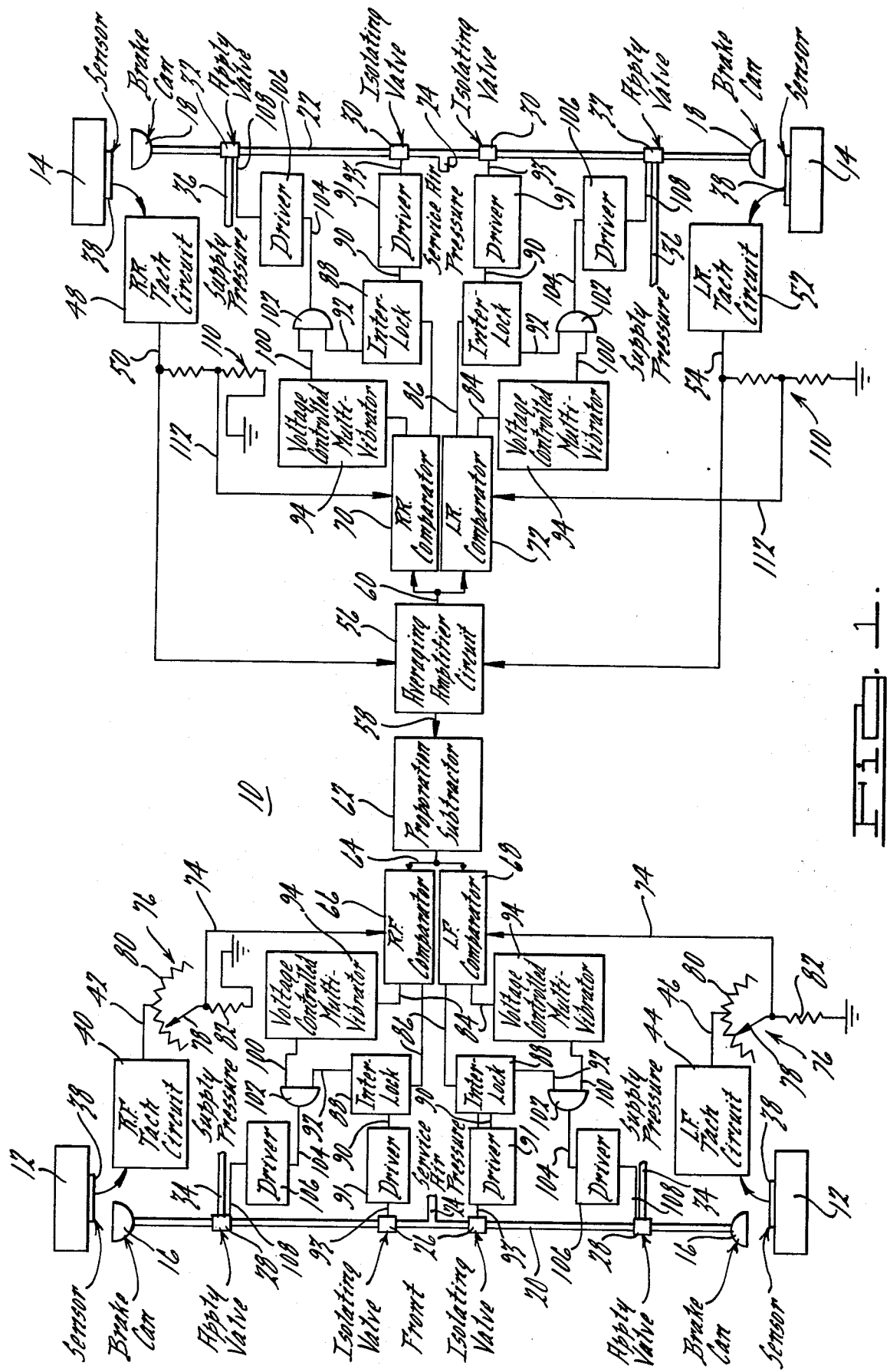
FIG. 1 is an overall block diagram of a preferred exemplary embodiment of an anti-spin control system according to the present invention.

In FIG. 1, an exemplary preferred embodiment of an anti-spin system 10 is illustrated. The anti-spin control system 10 is operatively associated with a vehicle having steerable wheels 12 at the front of the vehicle and fixed wheels 14 at the rear of the vehicle. The rear wheels 14 are normally driven at all times while the front wheels 12 are driven through a suitable power transfer mechanism when a predetermined differential exists between the average rear wheel speed and the average front wheel speed. The front wheels 12 are provided with brake canisters 16 which apply pressure to the brakes of the front wheels 12 while the rear wheels 14 are provided with brake canisters 18 which apply pressure to the brakes of the rear wheels 14. The canisters 16 and 18 are connected by transverse lines 20 and 22, respectively, which communicate with a main service air line 24. Service air on line 24 is applied to the front brake canisters 16 through isolating valves 26 and apply valves 28 which are interposed in the transverse line 20 while service air is applied to the rear brake canisters 18 through isolating valves 30 and apply valves 32 which are interposed in transverse line 22. The service air line 24 is connected to a supply of air pressure through an appropriate brake control valve so that the brakes may be applied by the vehicle operator. The apply valves 28 and 32 also receive supply pressure on lines 34 and 36, respectively. The apply valve 28 is effective to communicate either the line 20 or the line 34 to the front brake canisters 16 while the apply valves 32 are effective to communicate either the line 22 or the line 36 to the rear brake canisters 18.

Each wheel 12-14 is provided with a wheel speed sensor 38 of conventional design for providing a signal having a frequency representative of the rotational speed of the associated wheel. The right front wheel is provided with a right tachometer circuit 40 which receives the output signal of the associated wheel speed sensor 38 and provides a DC output signal on line 42 which has a magnitude representative of the speed of the right front wheel. A left front wheel tachometer circuit 44 receives the output signal of the wheel speed sensor 38 for the left front wheel and provides a DC output signal on line 46 having a magnitude representative of the speed of the left front wheel. A right rear wheel tachometer circuit 48 receives the output signal of the wheel speed sensor 38 for the right rear wheel and provides a DC output signal on line 50 having a magnitude representative of the speed of the right rear wheel. A left rear wheel tachometer circuit 52 receives the wheel speed signal from the wheel speed sensor 38 for the left rear wheel and provides a DC output signal on line 54 having a magnitude representative of the speed of the left rear wheel. The wheel speed signals on lines 50 and 54 from the right rear wheel tachometer circuit 48 and the left rear wheel tachometer circuit 52, respectively, are received by an averaging amplifier circuit 56 which provides reference speed signals on lines 58 and 60 which are representative of the average rear wheel speed, and which are taken to be a close approximation of vehicle speed. The average rear wheel speed signal, i.e., reference signal, on line 58 is received by a proportional subtractor 62 which reduces the signal on line 58 by a predetermined percentage which represents the degree that the rear wheels must slip prior to transfer of power to the front wheels. If the front wheels were driven in synchronism with the rear wheels, a proportional subtractor 62 would not be used. The proportional subtractor 62 provides a front wheel reference signal on line 64 which is received by a right front wheel comparator 66 and a left front wheel comparator 68. The reference signal on line 60 is provided to a right rear wheel comparator 70 and a left rear wheel comparator 72.

The left front comparator 68 receives a signal on line 74 from a steering angle compensating unit 76 which represents the compensated or corrected wheel speed of the left front wheel. More particularly, the steering angle compensating unit 76 includes a wiper arm 78 which is in electrical engagement with a resistance element 80 for varying the proportion of the left front wheel speed signal 46 which appears on the line 74 by forming a variable voltage divider with a resistor 82 connected to ground. The left front comparator 68 compares the front wheel reference signal on line 64 and the corrected wheel speed signal on line 74 and provides a signal on line 84 having a magnitude proportional to the magnitude of the difference between the signals on lines 64 and 74. When the magnitude of the difference achieves a preselected magnitude, the comparator output on line 84 reaches a maximum value and remains at that maximum value for all magnitudes of differences between the signals of lines 64 and 74 greater than the preselected magnitude. The signal on line 86, however, reaches maximum value upon a very small difference between the signals on lines 64 and 74 which is representative of a preselected minimum amount of wheel spin to which the system 10 will respond. The comparators 66 and 68 are preferably unidirectional comparators, i.e., they respond only to magnitudes of the compensated wheel speed signal which are greater than the magnitude of the reference speed signal, and not to magnitudes thereof which are less than the magnitude of the reference signal. Consequently, the unidirectional comparators provide output signals which are logically related only to wheel spins and not wheel skids.

An interlock circuit 88 receives the comparator output signal on line 86 and provides a signal on line 90 to an isolating valve driver circuit 91 which in turn provides a signal on line 93 to the isolating valve 26 for the left front wheel when the signal on line 86 exceeds a very small threshold value indicative of a very small magnitude of difference between the signals on lines 64 and 74. The signal on line 93 is effective to close the isolating valve 26.

The signal on line 84 from the left front wheel comparator 68 is received by a voltage controlled multivibrator 94 which provides a signal on line 100 which comprises a train of squarewave pulses of fixed duration with intervals between the pulses which vary in duration in inverse proportion to the magnitude of the signal on line 84. An AND gate 102 receives the signal on line 92 from the interlock circuit 88 and the signal on line 100 from the voltage controlled multivibrator 94 and provides a signal on line 104 whenever both signals exist. In this manner, the AND gate 102 serves an interlock function assuring that a control signal on line 104 will not be provided unless the interlock circuit 88 provides a signal on line 92 indicating that a spin condition does exist. The signal on line 104 from the AND gate 102 is received by an apply valve driver 106 which provides a signal on line 108 for moving the apply valve 28 from a position in which it communicates the brake canister 16 with line 20 (which is closed by the isolating valve 26) to a position in which it communicates the canister 16 with the supply pressure line 34. Preferably, each time the apply valve 28 is switched to communicate the brake canister 16 with the supply pressure line 34, a small relatively fixed quantity of air is admitted into the brake canister 16 to gradually increase the pressure within the brake canister 16 in accordance with the pulse frequency to correspondingly gradually increase the application of the brake of the wheel 12.

As indicated by like designating, the circuitry for the right front wheel is the same as that of the left front wheel. Accordingly, a separate description of that circuitry will not be provided herein.

The left rear wheel speed signal on line 54 is received by a voltage divider 110 which provides a signal on line 112 at an intermediate terminal thereof which is fixed proportion of the signal on line 54. If desired, the voltage divider 110 may be a variable voltage divider as shown at 76 for the front wheels to provide steering angle compensation. However, it has been found that offsetting the rear wheel speed signals by a fixed percentage, for example, 17%, results in a suitable level of accuracy and a suitable control function. The signal on line 112, therefore, can be considered a normalized or compensated rear wheel speed signal. The left rear comparator 72 receives the reference signal on line 60 and the normalized rear wheel speed signal on line 112 to provide signals on lines 84 and 86 as described with respect to the left front comparator 68. The remaining components for controlling the apply valve 32 and the isolating valve 30 for the left rear wheel is identical to that disclosed for the left front wheel, and consequently, the components are provided with like numbers to indicate like function. Additionally, the right rear wheel components are identical to the left rear wheel components as indicated by like numbers.

In FIGS. 1a and 1b, alternative modifications of the embodiment of the anti-spin system in FIG. 1 are shown. The system in FIG. 1a is substantially identical to the system in FIG. 1, except that instead of correcting the wheel speed signals as applied to the comparators, the system illustrated in FIG. 1a corrects the reference speed signals as applied to the comparators, the net effect at the comparator outputs being the same. In the modified system, the outputs from the right and left tachometer circuits 40' and 44' are supplied directly to the right and left comparators, 66' and 68' respectively. The front wheel reference signal on line 64' at the output of the proportional subtractor 62' provided to both steering angle compensating units 76' through a resistor 82'. The right and left front comparators 66' and 68' thus receive on line 65' from the steering angle compensating units 76' the compensated or corrected reference speed signals. The right and left comparators 66' and 68' then compare the respective right and left wheel speed signals with the corrected reference speed signals and provide output signals on lines 84' and 86' in the same manner as previously discussed with respect to the system in FIG. 1. Note, however, the corrected reference speed signal supplied to the right front comparator 66' is not equivalent to the corrected reference speed signal supplied to the left front comparator 68' for a given non-zero steering angle. The reason for this will become clear after reading the discussion below of FIGS. 2a–2c, 3 and 4.

Referring now to FIG. 1b, another modified version of the system illustrated in FIG. 1 is shown. In this embodiment, both the front reference speed signal and the right and left front wheel speed signals are supplied directly to the comparators 66" and 68". The output signals from the comparators are then provided through a resistor 82" to the steering angle compensating units 76" which in turn provide to the output lines 84" and 86" substantially the same adjusted slip signal as is supplied by the comparators to the output lines 84, 86 and 84', 86' in FIGS. 1 and 1a, respectively. A more detailed description of the operation of this embodiment is contained below in the discussion of FIG. 5b.

Figure 2A:
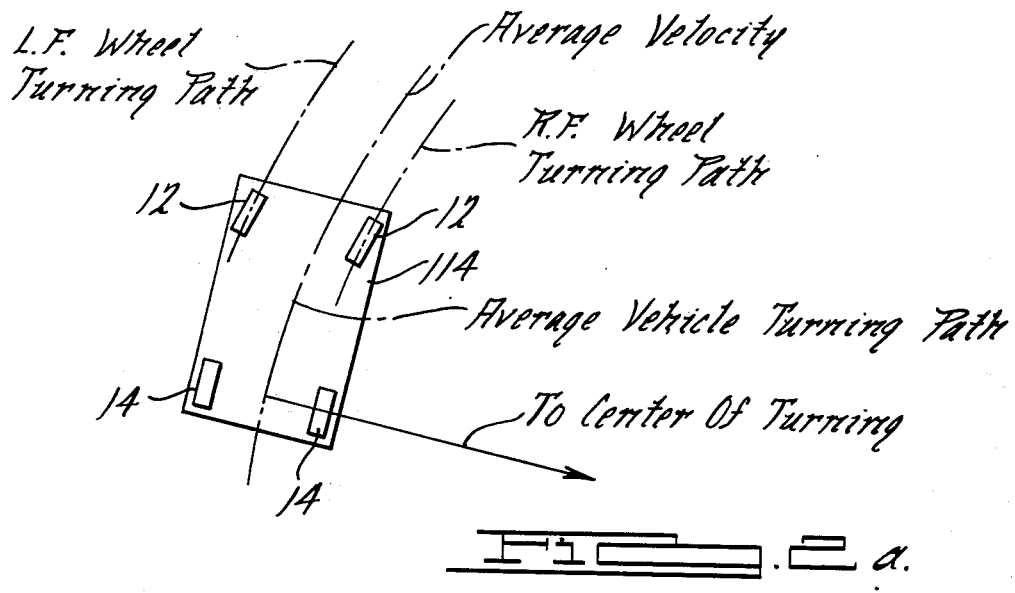
FIG. 2a is a view of a vehicle having one pair of steerable wheels depicted as executing a turn of a first radius of turning.
Figure 2B:
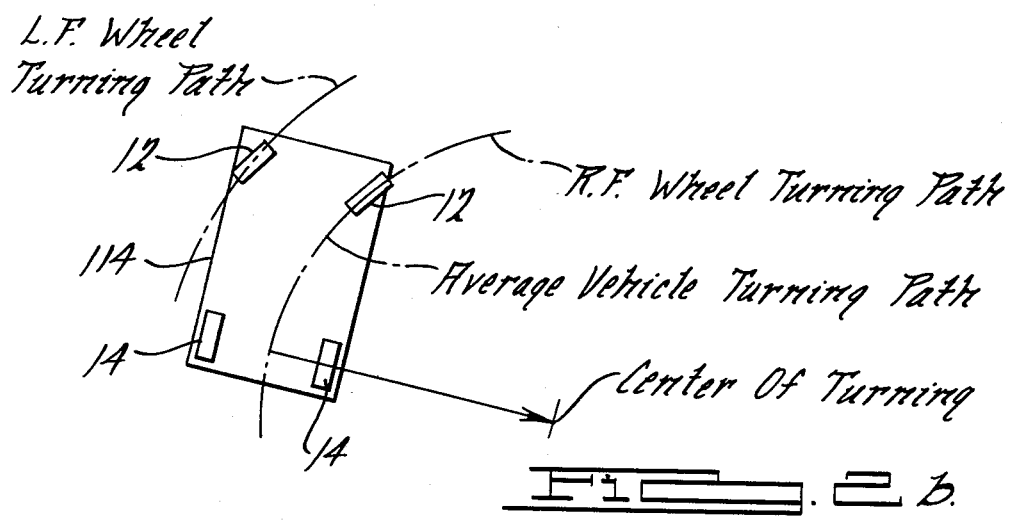
FIG. 2b is a view of a vehicle having one pair of steerable wheels depicted as executing a turn of a second lesser radius of turning.
Figure 2C:
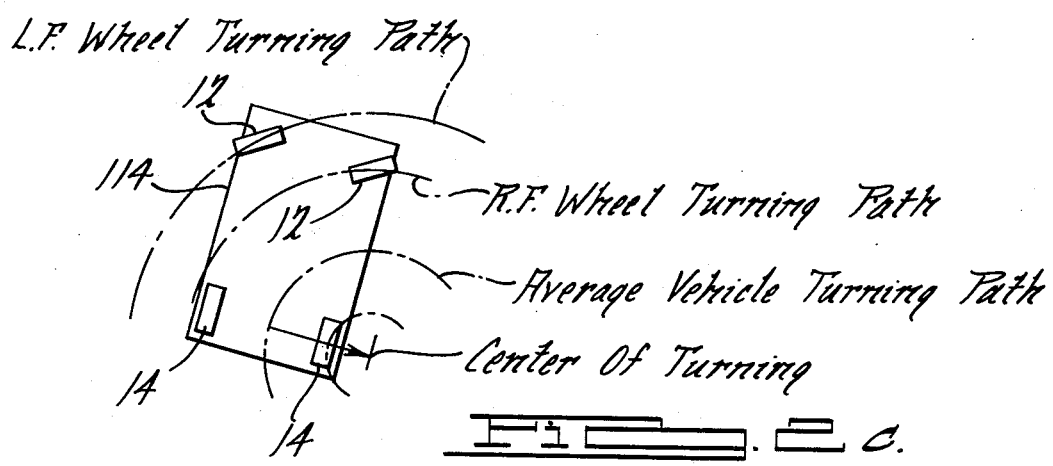
FIG. 2c is a view of a vehicle having one pair of steerable wheels depicted as executing a turn of a third yet lesser radius of turning.

With reference now to FIGS. 2a–2c, the relationship of the turning radius of the inside front wheel to the average vehicle turning radius for various steering angles can be best appreciated. In FIG. 2a, a vehicle 114 is seen to be executing a relatively gradual turn, the consequently, the angulation of the front wheels 12 relative to the longitudinal axis of the vehicle 114 is slight. It should be noted that the vehicle 114 has steerable front wheels 12 and fixed rear wheels 14. Consequently, the average vehicle turning path can be measured along a line midway between the rear wheels 14 on a vector which is perpendicular to a line joining the rear wheels 14. The radius of the vehicle average turning path is definable as the distance from midway between the two rear wheels to a center of turning of the vehicle (not shown in FIG. 2a). It should be noted that the turning path of the inside front wheel, the right front wheel in this case, is inside of the average vehicle turning path and may be defined as a circle having a lesser radius than the radius of turning of the vehicle average turning path. Consequently, the inside front wheel has a lesser velocity than the vehicle average velocity since it is following a shorter path during the course of the turn.

In FIG. 2b, the vehicle 114 is seen to be executing a turn of smaller turning radius consequent a greater steering angle of the front wheels 12. In this case, the vehicle average turning path is essentially coextensive with the inside wheel turning path. Therefore, the velocity of the inside wheel is the same as the vehicle average velocity since they are following the same length path during the course of the turn.

In FIG. 2c, the vehicle 114 is seen to be executing a turn of lesser radius consequent an even greater steering angle. In FIG. 2c, the inside wheel is seen to have a greater radius of turning than the vehicle average radius of turning, and consequently, the inside wheel speed is greater than the vehicle average speed.

With regard now to the outside front wheel, it can be seen that the radius of turning of the outside front wheel is always greater than the vehicle average radius of turning so that the velocity of the outside front wheel is always greater than the vehicle average velocity. Moreover, the radius of turning of the outside front wheel increases relative to the vehicle average radius of turning with increasing steering angle. Therefore, the speed of the outside front wheel increases relative to the vehicle average speed as the steering angle increases. With regard to the rear wheels, it can be seen that there is a difference between the vehicle average velocity and each of the velocities of the inside rear wheel and the outside rear wheel which varies with steering angle to a lesser degree than the inside front wheel.

In the preferred form of the anti-spin control system 10 of this invention, the reference signal is the vehicle average speed as determined by averaging the speeds of the rear wheels of the vehicle. This is generally a good measure of the vehicle average speed when the rear wheels are not slipping and when the vehicle is not experiencing a severe turn. When both rear wheels spin up at the same rate, and the spin up of the front wheels is at the same or a lesser rate, the spin of the wheels is not sensed by the present control system, and hence no corrective action is taken. This is deemed to be advisable for most off-road vehicles since there are times when the operator should retain sufficient control of the vehicle to cause such excessive spin at the wheels to extricate the vehicle from potentially dangerous situations. On some systems, it may be desirable to use a vehicle velocity analog signal derived from a vehicle accelerometer or the like which provides a signal which is independent of the rear wheel speed signal when the rear wheels spin up excessively. In those systems, it would be preferred to use a engine throttle control to control the power delivered to the wheels rather than a wheel brake control as specifically disclosed herein. For example, engine throttle control may be accomplished by a control system connected to the engine carburetor or fuel injection system for controlling the fuel feed to the engine, or a control system for interrupting the ignition of the engine.

Figure 3:
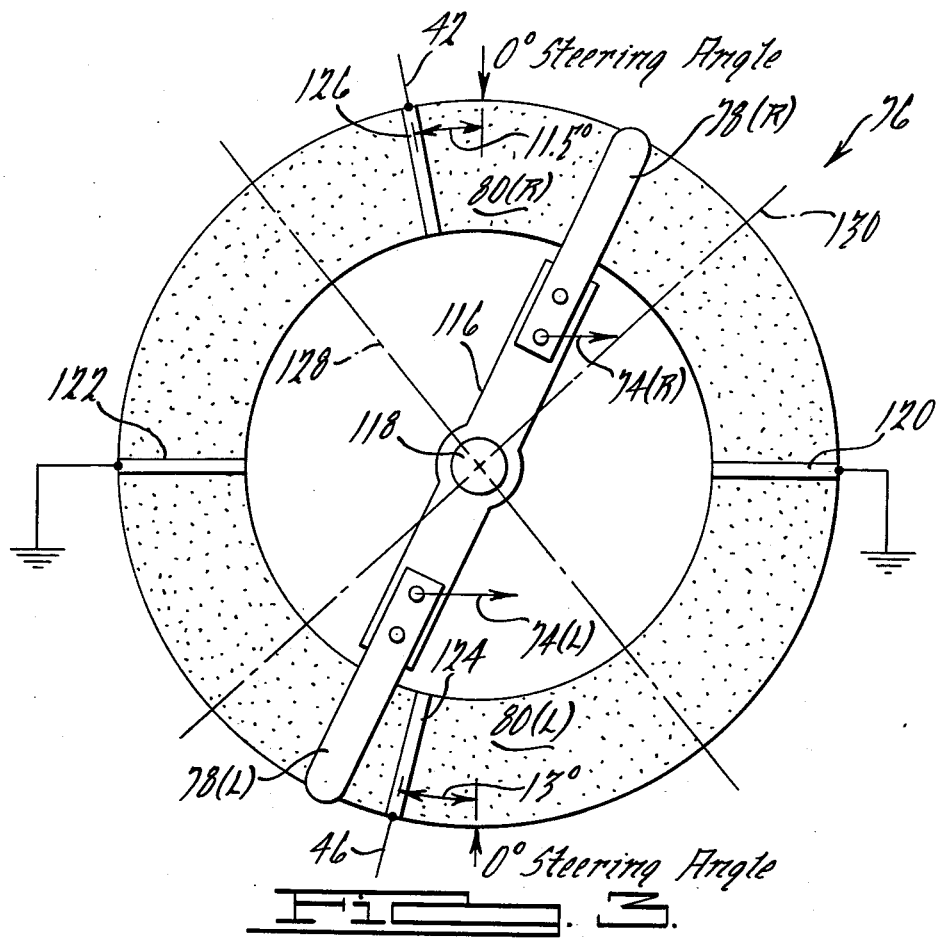
FIG. 3 is a view of an exemplary preferred embodiment of a steering angle compensating unit according to the present invention.

In FIG. 3, a steering angle compensating unit 76 for the steerable front wheels of the vehicle is shown in greater detail. The steering angle compensating unit 76 is seen to have a resistive element 80 which may be a layer of resistive material or a wirewound resistive element providing a right wheel resistance element portion 80(R) and a left wheel resistance element portion 80(L). The portions 80(R) and 80(L) are electrically engaged by contacts 78(L) and 78(R), respectively. The contact elements 78(L) and 78(R) are secured to opposite ends of an arm member 116 which is rotatable with a shaft 118 which in turn is suitably secured or associated with the pitman arm of the steering unit for the vehicle 114 for rotation therewith. End terminals 120 and 122 are positioned in diametrically opposed positions and are connected to ground as illustrated. An intermediate, left front wheel conductor 124 is connected to the line 46 which carries the left front wheel speed signal and is positioned approximately 13° clockwise from the location on the resistance element portion 80(L) corresponding to 0° steering angle, i.e. the contact 78(L) will be positioned at the 0° steering angle location when the vehicle is steered along a straight course. The 0° location is selected to be midway between the conductors 120 and 122. A conductor 126 is connected to the line 42 which carries the right front wheel speed signal and is positioned 11.5° from the 0° steering angle location on resistance element portion 80(R). The wiper contacts 78(R) and 78(L) are movable from center line 128 to center line 130.

Considering now a case in which a constant potential right wheel speed signal is supplied to the conductor 42 so that the potential at the contact 126 remains at that constant potential, movement of the slidable contact 78(R) from the 0° steering angle position in a clockwise direction decreases the potential on the conductor 74(R) received from the wiper contact 78(R) as the impedance of the path between the contact 126 and the wiper contact 78(R) increases. This change in the impedance (or transfer characteristic) is illustrated in the right wheel trace in FIG. 4 for left turns. Considering now counterclockwise movement of the slidable contact 78(R) from the 0° steering angle position, the resistance between the contact 126 and the contact 78(R) will decrease until the slidable contact 78(R) is positioned over the contact 126 (after 11.5° of counterclockwise steering angle rotation from the 0° steering angle position in the exemplary embodiment). Thereafter, the resistance between the contact 126 and the wiper contact 78(R) increases for continued counterclockwise movement, as can be seen in the trace for right turns of the right wheel in FIG. 4.

Figure 4:
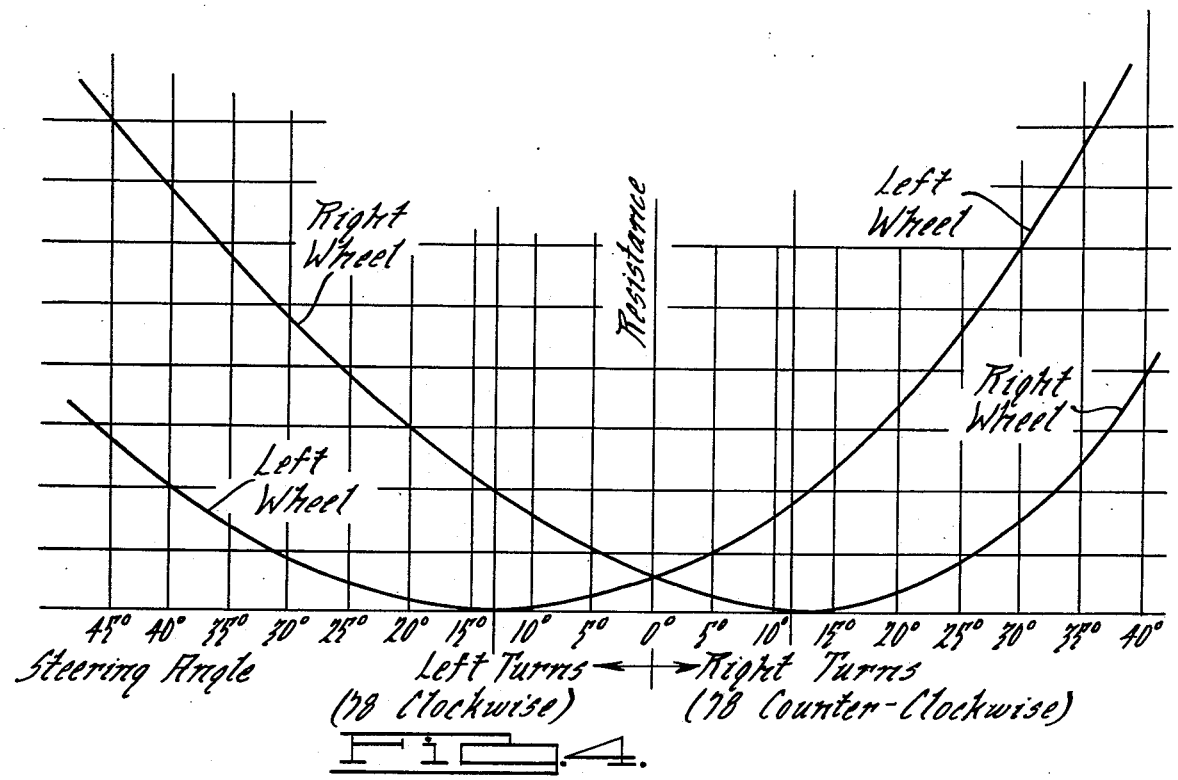
FIG. 4 is a graphical representation of the transfer function of the steering angle compensating unit of FIG. 3.

With regard to the contact 78(L) for the left wheel, it can be seen that clockwise movement from the 0° position causes a decrease in the resistance between the contact 124 and the slidable contact 78(L) until the slidable contact 78(L) engages the contact 124 (after 13° of clockwise movement in the exemplary embodiment) as can be seen in the trace of FIG. 4 for left turns of the left wheel. Thereafter, the resistance between the contact 124 and the slidable contact 78(L) increases as illustrated in the trace for left turns of the left wheel in FIG. 4. When the slidable contact 78(L) is moved counterclockwise from the 0° steering angle position, the resistance between the contact 124 and the slidable contact 78(L) increases as illustrated in the trace for right turns of the left wheel in FIG. 4.

In the exemplary embodiment reference herein, the amount of pitman angle rotation required to position the contacts 78(R) and 78(L) over the contacts 126 and 124 was different from right and left turns, i.e., 11.5° and 13° respectively, due to asymmetry in the steering mechanism of the vehicle for which it was specifically designed.

In view of the above, it can be seen that as the radius of turning in decreased, the speed of the inside wheel initially decreases relative to the average vehicle velocity (for the first 11.5° of pitman arm rotation for turns in which the right wheel is the inside wheel and the first 13° of pitman arm rotation for turns in which the left wheel is the inside wheel in one exemplary system application), and thereafter, the radius of turning of the inside wheel begins to increase relative to the average turning radius for the vehicle (until at 23° of pitman arm rotation for turns in which the right wheel is the inside wheel and 26 of pitman arm rotation for turns in which the left wheel is the inside wheel in the above exemplary system application) at which time the inside wheel speed and the vehicle average speed are the same. Thereafter, the radius of turning and the speed of the inside front wheel are greater than the average radius of turning and the average speed of the vehicle and further increases in the radius of turning increase the ratio of inside front wheel speed to average vehicle speed. It will be appreciated that the wheel speed signal transferred through the steering angle compensating unit 76 is initially attenuated when the sliding contacts 76 are at the 0° location. As the unit is rotated in one direction, the attenuation is initially reduced so that the system 10 is more responsive to inside front wheel speed signals, and thereafter, the attenuation is increased as rotation is continued so that the system 10 is less responsive to inside front wheel speed signal. This "overcenter" action attenuates the wheel speed signal in a manner which is correlative to the changes in turning radius of the inside front wheel so that the corrected inside wheel spaced signal always approximates, or follows at a known offset, the expected average vehicle velocity signal when no wheel slippage occurs. The same function is provided for the outside front wheel, however, no "over center" action is provided.

It will also be appreciated that the front reference speed signal, as supplied to the steering angle compensating units 76' in the alternative embodiment disclosed in FIG. 1a, is attenuated in the same, but inverse, manner as the front wheel speed signals in the exemplary embodiment. Thus, the comparators in the two systems "see" the same net difference between their respective reference and wheel speed signals for a given turning radius.

Similarly, in the alternative embodiment illustrated in FIG. 1b, the outputs from the comparators are attenuated in the same manner as the front wheel spaced signals in the system shown in FIG. 1. Thus, the adjusted slip signals provided to the output lines 84" and 86" in the system in FIG. 1b are substantially identical to the adjusted slip signals at lines 84 and 86 in the exemplary system, given the same turning radius.

The rear wheels may be accommodated in a similar manner by providing a variable potentiometer which is connected to the pitman arm similarly to the front wheel potentiometer 76. However, in the case of the rear wheels, the inside wheel always has a turning radius which is less than the average turning radius for the vehicle, and consequently, the "over center" action would not be utilized. Provision would be made for reducing the attenuation of the signal of the inside wheel in accordance with increasing steering angle and increasing the attenuation of the outside wheel in accordance with increasing steering angle. It has been found, however, that a simplified system as shown at 110 in FIG. 1 can be used if the predominate concern during oridinary operation of the vehicle is the outside wheel.

The fixed voltage divider 110 shown in FIG. 1 subtracts a fixed percentage from each of the wheel speed signals on lines 50 and 54. This percentage is generally in accordance with the increase in wheel speed of the outside rear wheel relative to the vehicle average speed. It has been found that this increase in relative speed of the outside rear wheel, although varying with steering angle, can be accommodated for all practical purposes with a constant offset, for example, 17%, for an exemplary vehicle. Hence, a fixed voltage divider as shown at 110 can be used. It should be noted that the inside wheel speed which will be reduced due to the turning angle will also be reduced by the voltage divider 110 so that its value appears very much lower than the vehicle average speed under a non-slipping condition, i.e., approximately 34% where a 17% offset is provided by the fixed potentiometer 110 and an additional 17% offset is created by the steering angle of the vehicle. Consequently, only in very severe slipping conditions will the inside wheel spin up to a degree where it exceeds the average rear wheel speed reference voltage appearing at the comparator 70 or 72.

In FIG. 5, a detailed circuit diagram of an exemplary signal processing circuit for the wheel speed signals of the anti-spin control system 10 is illustrated. Although the circuit will be described with particular reference to the left front wheel, it will be appreciated that the above circuit is generally applicable to each of the wheels. The output signal of the tachometer circuit 40 on line 46 is provided to the steering angle compensating unit 76 through a dropping resistor 132 which reduces the signal on line 46 by a factor of approximately 6%. This 6% reduction in the wheel speed signal desensitizes the system to account for production tolerances, wheel wear, and similar factors. Depending on the particular system and the particular vehicle on which it is used, that desensitizing percentage provided by the resistor 132 may be between 5% and 15%. The signal from the tachometer circuit 40 is corrected by the steering angle compensating unit 76 as previously described so as to provide a signal on line 74 representative of corrected wheel speed. The signal on line 74 is provided to the subtracting terminal 3 of a comparator amplifier 68. For example, the comparator amplifier 68 can be a CA3094T integrated circuit available from the Radio Corporation of America, Solid State Division, Sommerville, New Jersey, which has terminals numbered as indicated in parenthesis on the above drawings. In this regard, differential amplifiers 88 and 142, to be discussed in detail hereinafter, may also be the aforementioned integrated circuit and are also provided with terminal numbers in parenthesis as appropriate for that integrated circuit.

The reference speed signal on line 64 is received by the adding terminal 2 of the comparator amplifier 68. The comparator amplifier 68 has an emitter terminal 6 connected to ground and a collector terminal 8 connected to output lines 86 and 84. The signal at terminal 8 is held at +5 volts by a connection to a lower voltage supply line 137 through a resistor 134 when the corrected wheel speed signal on line 74 is the same as or less than the reference speed signal on line 64. However, when a corrected wheel speed signal on line 74 is received which is greater than the reference speed signal on line 64, the terminal 8 acts as a current sink. More particularly, when the compensated wheel speed signal 74 exceeds the reference speed signal 64, the potential at the output terminal 8 is pulled down in accordance with the difference therebetween so that the signal on lines 86 and 84 are pulled down a like amount. The comparator amplifier 68 is disabled by a transistor 136 when the brakes are applied. More particularly, the transistor 136 is effective to clamp an enabling current terminal 5 to ground when a signal is received at its base from the brake light switch on line 138. Terminal 5 normally receives an enabling potential of 5 volts from the lower voltage supply line 137.

The signal on line 86 is received by the adding terminal 2 of an interlock amplifier 90 which also receives a +5 volt signal from the lower voltage supply line 137 at its substracting terminal 3. The interlock amplifier 88 is trimmed by a trimming resistor 140 so as to insure that it will not provide an output signal until the potential on line 86 falls slightly below 5 volts. In this regard, the interlock amplifier 88 has its collector terminal 8 connected to the 12-volt supply and its emitter terminal 6 to output lines 90 and 92. With this connection, the interlock amplifier 88 provides a positive potential when turned on, i.e., the output terminal 6 thereof acts as a driver The voltage controlled multivibrator 94 uses a differential amplifer 142 as identified above and receives the output signal of the comparator amplifier 68 on line 84 through a diode 144 and a resistor 146. The voltage controlled multivibrator 94 also receives an enabling signal on line 148 from the output terminal 6 of the interlock amplifier 88 at the enabling terminal 5 of the multivibrator amplifier 142. The multivibrator amplifier 142 receives a reference voltage from line 150 at its adding terminal 2 proportioned by resistors 149a and 149b and approximately one-half of the 5-volt level from the lower voltage supply line 137 to which resistor 149a is connected. When the output of amplifier 142 is high (i.e. during an output pulse), the reference voltage at terminal 2 is undisturbed. When the output of amplifier 142 is low (i.e. between output pulses), the reference voltage at terminal 2 is clampled to two diode drops above the low level by diodes 152 and 154. The multibrator amplifier 142 provides an output from its terminal 8 signal on line 100.

A control circuit 156 is connected to the substracting terminal 3 of the multivibrator amplifier 142 by conductor 158 and is connected to receive the signal on line 84 at terminal 160. The control circuit 156 includes a capacitor 162, a capacitor charge diode 164, and a capacitor discharge diode 166. The charge and discharge diodes 164 and 166 are each connected to the output terminal 8 of the multivibrator amplifier 142 by a conductor 168.

It should be noted that the terminal 160 which receives the signal on line 84 is in the discharge path of the capacitor 162. It will be appreciated that the output terminal 8 of the multivibrator amplifier 142 acts as a current sink whenever the signal on line 150 from the 5-volt source is less than the signal on line 58 from the capacitor 162. The capacitor 162 is charged when the output terminal 8 is high, i.e., when the signal on line 150 is greater than the signal on line 158, and is discharged when the output terminal 8 is low, i.e., when the signal on line 150 is less than the signal on line 158. In its initial condition, the signal on line 150 is less than the signal on line 158 since the potential at output terminal 8 is not controlled absent an enabling or strobe signal at terminal 5, and therefore, the capacitor 162 is charged by the 5-volt source on line 137 through its charge path 164. When the interlock amplifier 88 provides an output signal on line 92 indicating that the wheel is in a slipping condition, an enabling or strobe signal is provided to the enabling terminal 5 by the line 148 which then causes the output terminal 8 to act as a current sink to pull down the signal at the output terminal 8. When that signal is pulled down, the potential of line 150 follows at two diode drops above the potential at terminal 8 by virtue of the diodes 152 and 154. The capacitor 162 discharges during the period that the output terminal 8 is low until the potential on line 158 becomes less than the potential on line 150 at which time the multivibrator amplifier 142 turns off to bring the output terminal 8 back up to the +5 volt lever provided by the connection through resistor 170 to the 5-volt reference line. The capacitor 162 will then recharge until the potential on line 158 becomes greater than the potential on line 150 whereby the output signal at terminal 8 will again be pulled down. This cycle repeats to provide squarewave pulses at the output terminal 8 which have a fixed "on" or high-potential time. The "off" time of the pulses, i.e., the interval between the pulses, is varied in accordance with a signal on line 184 which varies the rate at which the capacitor 162 is discharged by varying the current in the discharge path 166. It will be appreciated that increased current flow into the discharge circuit 166 from the line 84 when the output terminal 8 of the comparator amplifier 68 is near the 5-volt level slows the discharge of the capacitor 162 so that it requires a longer period of time before the potential on line 158 falls below the potential of line 150 to increase the "off" time of the multivibrator amplifier 142. Therefore, since the output terminal 8 of the comparator amplifier 68 is nearer the 5-volt level for lesser differences between the corrected wheel speed signal on line 74 and the reference speed signal on line 64, the pulses on the output line 100 from the output terminal 8 of the multivibrator amplifier 142 are more widely spaced, i.e., the pulses are provided at a lower frequency of repetition. As the difference between the corrected wheel speed signal on line 74 and the reference speed signal on line 64 increases, the pulses on the output line 100 from the output terminal 8 of the multivibrator amplifier 142 are more closely spaced, i.e., the pulses are provided at an increased frequency of repetition.

Advantageously, the initial "off" time of the pulses from the multivibrator 94, i.e., the initial low potential period at the output terminal 8 of the multivibrator amplifier 142, is longer than subsequent "off" periods which is found to provide improved operational stability and to provide useful noise rejection.

In one exemplary embodiment, the response of the comparator amplifier 68 was adjusted so that the output of the comparator at terminal 8 was pulled down from 5 volts to 0 volts in response to a 5-mile-an-hour difference between the corrected wheel speed and the reference speed and the response of the multivibrator 98 was established so that its output was nearly continuous, i.e., the interval between pulses was small, when the 5-mile-an-hour difference was attained. Under that condition, the apply valve 28 was not responsive to the short interval between pulses so that is was held in a position to communicate full supply pressure to the brake canister 16 to fully apply the brake of the wheel.

The output pulses on line 100 from the multivibrator amplifier 142 and the output signal on line 92 from the interlock amplifier 88 are received by respective transistors 171 and 172 of the AND gate 102. It will be noted that a current path is provided through the AND gate 102 when both transistors 171 and 172 are turned on in response to simultaneous positive signals on lines 100 and 92 to provide an input signal on line 104 to driver amplifier 106. The driver amplifier 106 has amplification stages 174 and 176 which are turned on in response to the input signal on line 104. Consequently, the driver amplifier 104 provides an output pulse on line 108 to the apply valve 28, for the purposes previously set forth, each time a pulse appears on line 100 and a signal also is present on line 92.

When a signal is present on line 90, stages 178, 180 and 182 of a driver amplifier 91 are turned on to supply an output signal to the isolating valve 26 on line 93 for the purposes previously described.

Alternatively to the above-described embodiment, a steering angle compensating unit similar to that used to adjust the wheel speed signal, can be used to adjust either the reference signal from the averaging circuit or the slip signal from the comparator in accordance with the steering angle to accomplish the same result.

Figure 5A:
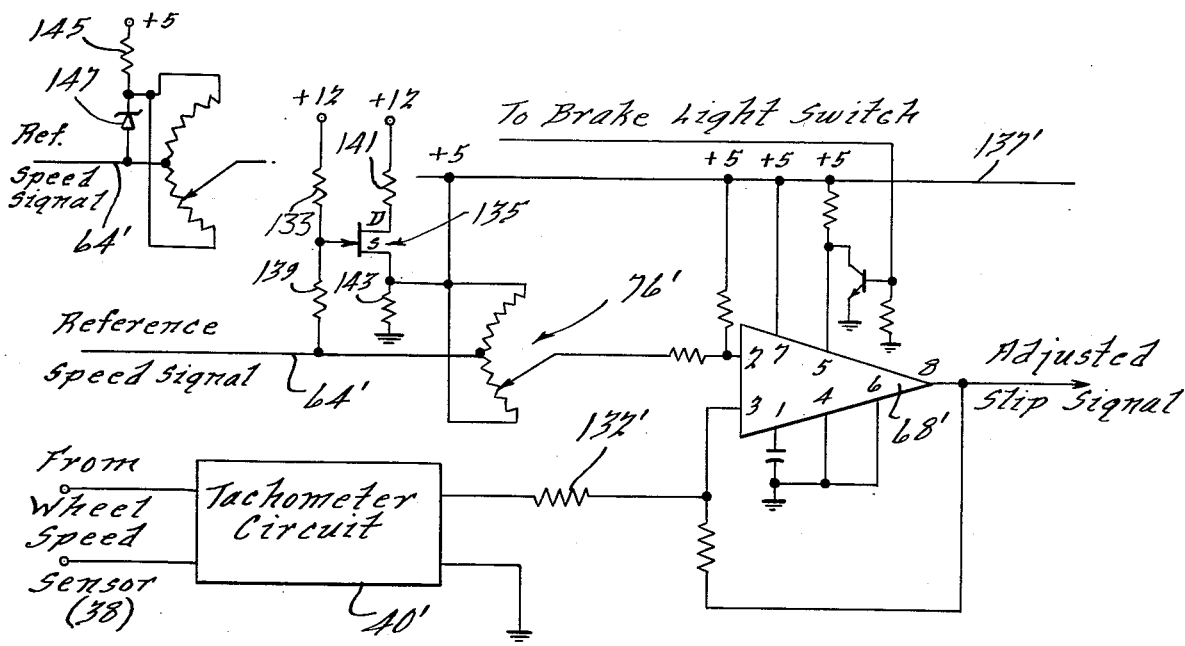

Referring to FIG. 5a, the alternative embodiment wherein the reference speed signal is adjusted is shown. The circuit elements common to both FIGS. 5 and 5a are similarly labeled, with those in FIG. 5a being distinguished by a prime (').

In this embodiment, the output signal from the tachometer circuit 40' is applied directly to the negative terminal 3 of comparator 68' through resistor 132'. The reference speed signal on line 64' is provided to the steering angle compensating unit 76' which in turn supplies to the positive terminal 2 of comparator 68' a "corrected" reference signal. Specifically, referring to this simplified version shown in the insert in FIG. 5a, the end terminals of the compensating unit 76' are connected to the reference signal line 64' through a zener diode 147, and also to +5 volts through resistor 145. The fixed up of the potentiometer 76' is tied to the reference signal line 64' and the wiper is fed to the positive terminal 2 of comparator 68'. The remainder of the circuit is the same as that in FIG. 5. The connection of the zener diode 147 between the reference speed line 64' and the end terminals of the potentiometer 76' permits the potential at the end terminals of the potentiometer 76' to increase as the reference speed signal increases. In this manner, the correction in the reference speed signal represents an approximate complement of the adjustment that would be made to the wheel speed signal in the circuit of FIG. 5, given the same average vehicle turning radius, so that the absolute difference between the two signals at the inputs to the comparators 68 and 68' remains essentially the same. This simplified circuit can easily be applied to vehicles having limited speed capabilities.

Due to inherent vehicle characteristics, it has been found to be desirable to increase or "enhance" the effect the compensating potentiometer 76' has on the reference speed signal as the speed of the vehicle increases (i.e., for increasing reference speed signals), especially when the subject vehicle has a wide speed range. It should be noted, however, that the circuit will function adequately without this addition.

On the other hand, if an even more accurate simulation of actual wheel speed conditions for a wide range of vehicle speeds is desired, the embodiment of FIG. 5a can be employed. The circuit modification with the zener diode 147 shown in the insert assumes substantially a one-to-one relationship between increased vehicle speeds and increased variations in actual and adjusted wheel speeds. In reality, however, the relationship is more closely assimilated to a geometric progression. In FIG. 5a, the reference speed line 64' is shown connected to the fixed tap of potentiometer 76' and through a pair of series connected resistors 133 and 139 to +12 volts. The gate terminal of an N-channel FET 135 is connected between the two series resistors 133 and 139. The drain of FET 135 is tied to +12 volts through resistor 141, and the source is connected to the end terminals of potentiometer 76' and through resistor 143 to ground. The values of resistors 133 and 139 are selected so that for a zero reference speed signal the potential from the voltage-divider network present at the gate of the FET 135 is approximately 1.4 – 1.5 volts. Due to the follower circuit arrangement of the FET 135, the voltage at the source will reflect amplified changes of the voltage at the gate of the FET 135. Furthermore, the percentage increase in change of the signal on the source line for a given change in the reference signal is dependent upon the values of resistors 141 and 143 and the gain characteristics of the FET 135. Thus, by proper selection of these components the operating characteristics of a particular vehicle can be more accurately simulated.

Figure 5B:
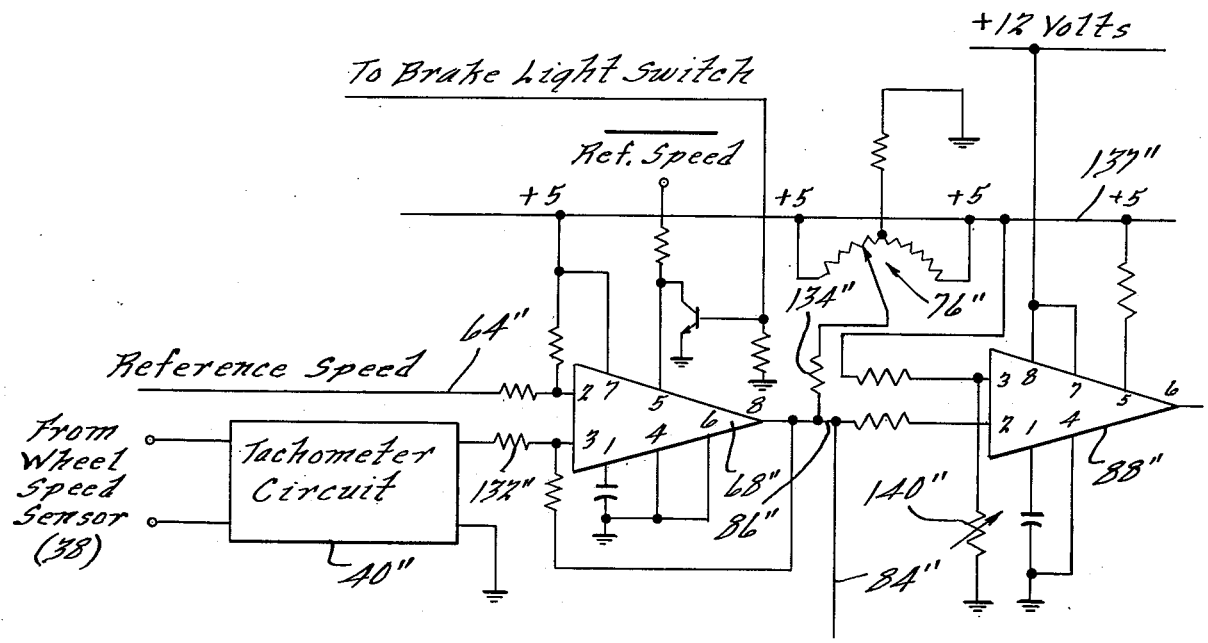
FIG. 5b is a circuit diagram of the alternative embodiment disclosed in the block diagram of FIG. 1b.

Referring now to FIG. 5b, the alternative embodiment wherein the slip signal from the comparator is adjusted is disclosed. In this embodiment, the reference speed signal on line 64" and the output from the tachometer circuit 40" are connected directly to the positive 2 and negative 3 terminals respectively of the comparator 68". The slip signal from the output terminal 8 of comparator 68" is connected through resistor 134" to the movable tap of potentiometer 76". The fixed tap of the potentiometer 76 is connected through a resistor to ground, and the end terminals are connected to the 5-volt reference line 137". Note also that the bias resistor from pin 5 of comparator 68" is connected to the inverted reference speed signal line instead of to the 5-volt reference line as in the circuit of FIG. 5. This is to provide improved gain accuracy via control of the comparator amplifier 68" with respect to speed according to the design specifications of the particular integrated amplifier used. Again, it should be noted that the circuit will function satisfactorily if pin 5 of comparator 68" is connected to the +5 volt reference line 137" as in the exemplary embodiment. For the circuit of FIG. 5b to properly function when the wheel speed signal is greater than the reference speed signal but not indicative of an overspin, the trim potentiometer 140" must be adjusted so that the potential maintained at pin 3 of amplifier 88" is approximately 3 volts, instead of just under 5 volts as in the circuit in FIG. 5.

In operation, when the steering angle increases in one direction, e.g., a left turn for the left wheel, the variable potentiometer 76" adjusts the voltage at the output pin 8 comparator 68" to initially diminish the amplifying range of comparator 68", thereby requiring less overspin for compromise, and then at the "over center" position, begins to increase the amplifying range of the comparator 68", thereby requiring proportionately greater overspin for compromise. Thus, the resulting adjusted slip signal as applied to output lines 84" and 86" is essentially the same as that which would be achieved by the embodiments disclosed in FIGS. 5 and 5a.

Although the steering angle compensating unit 76 is described as comprising a potentiometer with an intermediate terminal connected to receive the wheel speed signal and a wiper connected to provide the corrected wheel speed signal, it will be appreciated that the wiper may be connected to receive the wheel speed signal and the intermediate terminal may be connected to provide the corrected wheel speed signal without change in function.

It will be appreciated that the portion of the control system disclosed herein for the rear wheels of the vehicle could be used independently of the control system for the front wheels in a vehicle having rear wheel drive only, and hence, the principles of this invention which are described with respect to the rear wheel control system would be applicable to such a control system for vehicles having rear wheel drive only.

In view of the foregoing explanation of the preferred exemplary embodiment of the anti-spin control system according to this invention, it will now be appreciated that a spin control system is provided which corrects wheel speed signals to accurately reflect variations in wheel speed with variations in steering angle so that very small degrees of slip can be measured and controlled. This is accomplished by incorporating a steering angle compensating unit which utilizes a relatively straightforward potentiometer to provide an "over center" correction of the wheel speed signal of the inside front steerable wheel of a vehicle. As an additional advantageous feature of the present invention, comparators are provided which have a unidirectional response to differences between the wheel speed and the reference speed so as to be responsive only to wheel spin conditions.

While it will be apparent that the teachings herein are well calculated to teach one skilled in the art the method of making preferred embodiments of this invention, it will be appreciated that the invention is susceptible to modification, variation and change without departing from the proper scope or meaning of the subjoined claims.

I claim:

1. A spin control system for a steerable vehicle having first and second wheels which are driven at least under predetermined conditions and are steerable through varying angles of steering and which are disposed on laterally opposed sides of said vehicle so that an inside one of said wheels is disposed closer to the center of turning of said vehicle during steering in one direction than the other of said wheels comprising:
    means for generating a signal representative of the speed of said inside wheel;
    means for generating a reference signal;
    compensating means for adjusting the value of said wheel speed signal in accordance with the steering angle of said inside steerable wheel so that, absent a spin condition at said inside steerable wheel, the output of said compensating means at the 0° steering angle position defines a first signal value and for turns in said one direction from a straight course, the value of the output signal from said compensating means is greater than said first signal value when the turning radius of said inside steerable wheel is less than the average turning radius of said vehicle, is equal to said first signal value when the turning radius of said inside steerable wheel is equal to the average turning radius of said vehicle, and is less than said first signal value when the turning radius of said inside steerable wheel is greater than the average turning radius of said vehicle; and
    means for comparing said adjusted wheel speed signal and said reference signal for providing a spin signal.

2. A spin control system according to claim 1 wherein said compensating means includes a potentiometer having a pair of terminals which is adapted for varying the impedance between said pair of terminals in accordance with the steering angle of said inside steerable wheel in said one direction, said wheel speed signal being connected for transfer between said pair of terminals of said potentiometer for varying the value thereof in accordance with said variation in said impedance between said pair of terminals.

3. A spin control system according to claim 2 wherein said potentiometer includes a resistance element, a slidable contact engageable with said resistance element connected to one of said terminals, a contact connected to said resistors element intermediate the ends of said resistance element and connected to the other of said terminals, and a contact connected to said resistance element at a location spaced from said intermediate contact and connected to a reference potential, said slidable contact being engageable with said resistance element on the opposite side of said intermediate contact relative to said reference potential contact when said inside steerable wheel is steered along a straight course and being movable along said resistance element with steering of said inside steerable wheel in said one direction toward said reference potential contact across said intermediate contact to provide said variation in impedance.

4. A spin control system according to claim 3 wherein said slidable contact is on a rotatable arm for movement of said slidable contact in an arcuate path across said resistance element.

5. A spin control system according to claim 4 wherein said rotatable arm is connected to a steering member of said vehicle for rotation with movement of said steering member.

6. A spin control system according to claim 5 wherein said steering member of said vehicle is a rotatable pitman arm and said rotatable arm of said potentiometer is connected to said pitman arm for rotation therewith.

7. A spin control system for a steerable vehicle having first and second wheels which are driven at least under predetermined conditions and are steerable through varying angles of steering and which are disposed on laterally opposed sides of said vehicle so that an inside one of said wheels is disposed closer to the center of turning of said vehicle during steering in one direction than the other of said wheels comprising:
    means for generating a signal representative of the speed of said inside wheel;
    means for generating a reference signal;
    compensating means for adjusting the value of said reference signal in accordance with the steering angle of said inside steerable wheel so that, absent a spin condition at said inside steerable wheel, the output of said compensating means at the 0° steering angle position defines a first signal value and for turns in said one direction from a straight course, the value of the output signal from said compensating means is less than said first signal value when the turning radius of said inside steerable wheel is less than the average turning radius of said vehicle, is equal to said first signal value when the turning radius of said inside steerable wheel is equal to the average turning radius of said vehicle, and is greater than said first signal value when the turning radius of said inside steerable wheel is greater than the average turning radius of said vehicle; and
    means for comparing said wheel speed signal and said adjusted reference signal for providing a spin signal.

8. A spin control system according to claim 7 wherein said compensating means includes a potentiometer having a pair of terminals which is adapted for varying the impedance between said pair of terminals in accordance with the steering angle of said inside steerable wheel in said one direction, said reference signal being connected for transfer between said pair of terminals of said potentiometer for varying the value thereof in accordance with said variation in said impedance between said pair of terminals.

9. A spin control system according to claim 8 wherein said potentiometer includes a resistance element, a slidable contact engageable with said resistance element connected to one of said terminals, a contact connected to said resistance element intermediate the ends of said resistance element and connected to the other of said terminals, and a contact connected to said resistance element at a location spaced from said intermediate contact and connected to a reference potential, said slidable contact being engageable with said resistance element on the opposite side of said intermediate contact relative to said reference potential contact when said inside steerable wheel is steered along a straight course and being movable along said resistance element with steering of said inside steerable wheel in said one direction toward said reference potential contact across said intermediate contact to provide said variation in impedance.

10. A spin control system according to claim 9 wherein said slidable contact is on a rotation arm for movement of said slidable contact in an arcuate path across said resistance element.

11. A spin control system according to claim 10 wherein said rotatable arm is connected to a steering member of said vehicle for rotation with movement of said steering member.

12. A spin control system according to claim 11 wherein said steering member of said vehicle is a rotatable pitman arm and said rotatable arm of said potentiometer is connected to said pitman arm for rotation therewith.

13. A spin control system for a steerable vehicle having first and second wheels which are driven at least under predetermined conditions and are steerable through varying angles of steering and which are disposed on laterally opposed sides of said vehicle so that an inside one of said wheels is disposed closer to the center of turning of said vehicle during steering in one direction than the other of said wheels comprising:
means for generating a signal representative of the speed of said inside wheel;
means for generating a reference signal;
means for comparing said wheel speed signal and said reference signal for providing a spin signal; and
compensating means for adjusting the value of said spin signal in accordance with the steering angle of said inside steerable wheel so that, absent a spin condition at said inside steerable wheel, the output of said compensating means at the 0° steering angle position defines a first signal value and for turns in said one direction from a straight course, the value of the output signal from said compensating means is greater than said first signal value when the turning radius of said inside steerable wheel is less than the average turning radius of said vehicle, is equal to said first signal value when the turning radius of said inside steerable wheel is equal to the average turning radius of said vehicle, and is less than said first signal value when the turning radius of said inside steerable wheel is greater than the average turning radius of said vehicle.

14. A spin control system according to claim 13 wherein said compensating means includes a potentiometer having a pair of terminals which is adapted for producing a variable impedance signal between said pair of terminals in accordance with the steering angle of said inside steerable wheel in said one direction, said spin signal being connected to one of said terminals of said potentiometer for varying the value of said signal in accordance with said variable impedance signal.

15. A spin control system according to claim 14 wherein said potentiometer includes a resistance element, a slidable contact engageable with said resistance element connected to one of said terminals, a contact connected to said resistance element intermediate the ends of said resistance element and connected to the other of said terminals, and a contact connected to said resistance element at a location spaced from said intermediate contact and connected to a reference potential, said slidable contact being engageable with said resistance element on the opposite side of said intermediate contact relative to said reference potential contact when said inside steerable wheel is stored along a straight course and being movable along said resistance element with steering of said inside steerable wheel in said one direction toward said reference potential contact across said intermediate contact to provide said variation in said impedance signal.

16. A spin control system according to claim 15 wherein said slidable contact is on a rotatable arm for movement of said slidable contact in an arcuate path across said resistance element.

17. A spin control system according to claim 16 wherein said rotatable arm is connected to a steering member of said vehicle for rotation with movement of said steering member.

18. A spin control system according to claim 17 wherein said steering member of said vehicle is a rotatable pitman arm and said rotatable arm of said potentiometer is connected to said pitman arm for rotation therewith.

19. A spin control system for a steerable vehicle having first and second wheels which are driven at least under predetermined conditions and are steerable through varying angles of steering and which are disposed on laterally opposed sides of said vehicle so that an inside one of said wheels is disposed closer to the center of turning of said vehicle during steering in one direction than the other of said wheels, said vehicle being characterized by a sufficiently small turning radius capability such that for turns in said one direction at progressively greater steering angles of said driven steerable wheels resulting in progressively smaller turning radii, said inside steerable wheel in a first condition has a turning radius less than the average turning radius of said vehicle and hence the speed of said inside steerable wheel is less than the average vehicle speed when no spinning occurs at said inside steerable wheel, thereafter in a second condition has a turning radius equal to the average turning radius of said vehicle and hence the speed of said inside steerable wheel is the same as the average vehicle speed when no spinning occurs at said inside steerable wheel, and still thereafter in a third condition has a turning radius greater than the average turning radius of said vehicle and hence the speed of said inside steerable wheel is greater than the average vehicle speed when no spinning occurs at said inside steerable wheel, said spin control system comprising:
spin detecting means for said inside steerable wheel including wheel speed sensing means for producing a wheel speed signal representative of the rotational speed of said inside steerable wheel, reference speed generating means for producing a reference speed signal related to the average speed of said vehicle, and comparator means for comparing said wheel speed signal to said reference speed signal and producing a spin signal representative of the difference therebetween; and
compensating means responsive to the steering angle of said inside steerable wheel and operatively associated with said spin detecting means for affecting the value of said spin signal for turns in said one direction in accordance with the steering angle of said inside steerable wheel so that, the effective value of said spin signal is increased during said first condition, unaffected during said second condition, and decreased during said third condition.

20. A spin control system according to claim 19 wherein said compensating means includes a potentiometer having a pair of terminals which is adapted for varying the impedance between said pair of terminals in accordance with the steering of said vehicle in said one direction.

21. A spin control system according to claim 20 wherein said potentiometer includes a resistance element, a slidable contact engageable with said resistance element connected to one of said terminals, a contact connected to said resistance element intermediate the ends of said resistance element and connected to the other of said terminals, and a contact connected to said resistance element at a location spaced from said intermediate contact and connected to a reference potential, said slidable contact being engageable with said resistance element on the opposite side of said intermediate contact relative to said reference potential contact when said vehicle is steered along a straight course and being movable along said resistance element with steering of said vehicle in said one direction toward said reference potential contact across said intermediate contact to provide said variation in impedance.

22. A spin control system according to claim 21 wherein said slidable contact is on a rotatable arm for movement of said slidable contact in an arcuate path across said resistance element.

23. A spin control system according to claim 22 wherein said rotatable arm is connected to a steering member of said vehicle for rotation with movement of said steering member.

24. A spin control system according to claim 23 wherein said steering member of said vehicle is a rotatable pitman arm and said rotatable arm of said potentiometer is connected to said pitman arm for rotation therewith.

25. For a vehicle having first and second wheels which are driven at least under predetermined conditions and steerable in at least one direction through varying steering angles and which are disposed on laterally opposite sides of said vehicle so that one of said wheels is disposed closer to the center of turning of said vehicle during steering in one direction than the other of said wheels, a spin control system responsive to a signal related to the speed of said one wheel comprising:
steering angle compensating means having a transfer characteristic for adjusting the value of said signal in accordance with the steering angle of said wheels including an input terminal for receiving said signal and an output terminal for providing said adjusted value signal and means for varying the transfer characteristic of said steering angle compensating means between said input terminal and said output terminal during steering of said wheels in said one direction from a straight course in accordance with variations in said steering angle, such that for a progressively increasing steering angle in said one direction said transfer characteristic has an initial predetermined nonzero value for a zero degree steering angle, thereafter a value progressively approaching zero from said predetermined non-zero value, still thereafter a value progressively approaching said predetermined non-zero value as the steering angle of said wheels correspondingly approaches the condition wherein the turning radius of said one wheel equals the average turning radius of said vehicle, and still further thereafter a value progressively exceeding said non-zero value as the steering angle of said wheels correspondingly surpasses the condition wherein the turning radius of said one wheel equals the average turning radius of said vehicle.

26. A spin control system according to claim 25 wherein said transfer characteristic is an impedance between said input terminal and said output terminal.

27. A spin control system according to claim 26 wherein said compensating means comprises a potentiometer having said input and output terminals and which is adapted for varying the impedance between said input and said output terminals in accordance with the steering of said vehicle in said one direction, said signal being connected for transfer between said input and output terminals of said potentiometer for varying the value thereof in accordance with said variation in said impedance between said terminals.

28. A spin control system according to claim 27 wherein said potentiometer includes a resistance element, a slidable contact engageable with said resistance element connected to one of said terminals, a contact connected to said resistance element intermediate the ends of said resistance element and connected to the other of said terminals, and a contact connected to said resistance element at a location spaced from said intermediate contact and connected to a reference potential, said slidable contact being engageable with said resistance element on the opposite side of said intermediate contact relative to said reference potential contact when said vehicle is steered along a straight course and being movable along said resistance element with steering of said vehicle in said one direction toward said reference potential contact across said intermediate contact to provide said variation in impedance.

* * * * *

UNITED STATES PATENT AND TRADEMARK OFFICE
CERTIFICATE OF CORRECTION

PATENT NO. : 4,042,059
DATED : August 16, 1977
INVENTOR(S) : Robert B. Bertolasi It is certified that error appears in the above-identified patent and that said Letters Patent are hereby corrected as shown below:

Column 2, line 36, "difference" should be --differences--.
Column 5, line 21, "designating" should be --designation--.
Column 5, line 27, after "is" insert --a--.
Column 9, line 19, "spaced" should be --speed--.
Column 11, line 10, "clampled" should be --clamped--.
Claim 3, Column 15, line 57, "resistors" should be --resistance--.
Claim 10, Column 17, line 6, "rotation" should be --rotatable--.
Claim 14, Column 17, line 55, after the second occurrence of "said" insert --spin--.
Claim 25, Column 20, line 6, "nonzero" should be --non-zero--.

Signed and Sealed this

Eighteenth Day of April 1978

[SEAL]

Attest:

RUTH C. MASON
Attesting Officer

LUTRELLE F. PARKER
Acting Commissioner of Patents and Trademarks